(12) United States Patent
Haridim et al.

(10) Patent No.: US 10,985,791 B1
(45) Date of Patent: Apr. 20, 2021

(54) ADAPTIVE OPTIMIZATION OF WIRELESS RECEIVERS

(71) Applicants: Motti Haridim, Givat Ze'eb (IL);
Vyacheslav Snitkovsky, Parkdale (AU);
Martin Thazler, Ashdod (IL)

(72) Inventors: Motti Haridim, Givat Ze'eb (IL);
Vyacheslav Snitkovsky, Parkdale (AU);
Martin Thazler, Ashdod (IL)

(73) Assignee: OPTIMIFY PTY LTD, Parkdale (AU)

( * ) Notice: Subject to any disclaimer, the term of this patent is extended or adjusted under 35 U.S.C. 154(b) by 0 days.

(21) Appl. No.: 16/987,071

(22) Filed: Aug. 6, 2020

(51) Int. Cl.
*H04B 1/10* (2006.01)
*H04B 1/16* (2006.01)
*H04B 1/12* (2006.01)

(52) U.S. Cl.
CPC .......... *H04B 1/1036* (2013.01); *H04B 1/123* (2013.01); *H04B 1/1607* (2013.01)

(58) Field of Classification Search
CPC ..... H04B 1/1036; H04B 1/123; H04B 1/1607
See application file for complete search history.

(56) References Cited

U.S. PATENT DOCUMENTS

| 7,349,503 | B2 | 3/2008 | Husted et al. | |
|---|---|---|---|---|
| 10,833,783 | B2 * | 11/2020 | Abdelmonem | H04J 11/0026 |
| 2008/0139110 | A1 * | 6/2008 | Lai | H04H 40/90 |
| | | | | 455/3.02 |
| 2013/0017850 | A1 * | 1/2013 | Abdelmonem | H04B 1/7093 |
| | | | | 455/501 |

FOREIGN PATENT DOCUMENTS

WO    WO 2019/169442    9/2019

* cited by examiner

*Primary Examiner* — Janice N Tieu
(74) *Attorney, Agent, or Firm* — Henry M. Feiereisen LLC (57) ABSTRACT

A method and device for adaptive performance optimization of wireless receivers operating in dynamic electromagnetic environments are disclosed. The wireless receiver measures the frequency and amplitude of all interference signals that can affect the quality of the desired received signal. Based on the interference signals, the wireless receiver estimates the effects of the interference signals on the desired received signal and mitigates the influence of the interference signals by totally suppressing or at least significantly reducing the interference signals through the use of adjustable components along the receiving chain. By dynamically adapting the receiver's sensitivity and selectivity, the most optimal conditions for receiving the desired signal at each moment are provided.

17 Claims, 6 Drawing Sheets

Figure 1

- Prior Art -

ADAPTIVE OPTIMIZATION OF WIRELESS RECEIVERS

BACKGROUND OF THE INVENTION

The present invention relates generally to the field of receivers in any wireless communication system, mobile or static, operating in a dynamic channel, subject to a dynamically changing electromagnetic environment. More particularly, it is related to methods for dynamic changing of the wireless receiver's parameters such as sensitivity and selectivity in order to increase the reception quality.

The following discussion of related art is provided to assist the reader in understanding the advantages of the invention, and is not to be construed as an admission that this related art is prior art to this invention.

Conventional wireless receivers are designed according to predetermined levels of sensitivity and selectivity that are based on a designers knowledge of general statistics of the wireless channel between the transmitter and the receiver. Hence, the wireless receiver parameters are determined at best as a compromise between various, often contradicting, requirements in order to yield adequate results under all conditions. Having no tunable components, conventional wireless receivers cannot provide real-time improvement of the reception process in response to the instantaneous and actual channel conditions, especially under harsh channel conditions.

In any communication system, high quality wireless receivers are required in order to "recover" the desired signal with high fidelity and minimum noise. In wireless systems, the quality of received signal is often affected by the presence of various spurious signals, due to blockers, image signals, adjacent channels, intermodulation distortion, etc., in both in-band and out-band spectrum.

There are simulation methods and programs for calculating the communication range and required sensitivity of wireless receivers under various propagation conditions in frequencies. These calculations do not take into account for the presence of actual instantaneous interferences at the input of the wireless receiver, which lead to a decrease in communication range, reception errors, and incorrect selection of system parameters. But, the level of these interferences is determined by standard guidelines and often differs remarkably from the actual instantaneous interferences.

Thus, only measurement of interference with a spectrum analyzer does not solve this problem because no algorithm is used for analyzing the effects of interference on receiver parameters. In conventional receivers, there are no tunable components to be reconfigured in response to the observations. Previous methods for improving the wireless receiver performance typically entail electromagnetic interference measurements utilizing a spectrum analyzer and predicting, often guessing, the correct communication parameters. However, such a process is frequently error prone, resulting in incorrect setting of operational frequencies, transmission power, sensitivity and selectivity of the receiver and the like.

Wireless channels, in which mobile devices and base stations operate, include interfering signals stemming from both external and internal sources. Internal interfering spurious signals are generated due to various nonlinear components, such as amplifiers and mixers, along the reception chain. External interfering signals might be generated by various sources, such as nearby mobile devices and base stations, operating at frequencies outband to the desired signal channel.

Wireless devices are designed according to the guidelines of various standards such as FCC, IEEE and standards of other countries, that determine the required performance, in terms of sensitivity (a minimum detectable signal-MDS), the selectivity levels, image rejection, capability, etc. of the receiver. Here, selectivity is defined as difference between the interference power at which the receiver should operate and its sensitivity.

Under certain circumstances, a wireless receiver may fall to detect properly the desired signal even though the receiving power level is far above the sensitivity level, because the predetermined selectivity of the receiver is not high enough.

The very nature of the conventional wireless receivers with fixed levels of sensitivity and selectivity determined by static and non-tunable components does not allow a wireless receiver to react to the actual conditions of the physical channel and avoid performance degradation in such aforementioned conditions.

The reaction of these systems to erroneous reception and poor performance occurs during the transmission of information, which leads to loss of information. It is important to anticipate the communication problem and if possible, to reconfigure the receiver instantaneously to avoid loss of data.

As an example, in an urban environment, as the level of intermodulation interference increases, the radio communications range is limited. Conventional methods dynamically adjust and increase the transmission power, causing rapid consumption of batteries, and are subject to restriction of transmission power due to standards. In certain cases, cognitive radios search for a new frequency that requires adjusting the complete system.

To assure high-quality reception under all channel conditions, an adaptive receiver is required. The present invention seeks to provide wireless receivers with the ability to reconfigure themselves according to the actual "picture" of the desired signal and interferences at each instance and to provide improved performance of the wireless receiver under the conditions of the actual scenario at each time, overcoming or substantially ameliorating at least some of the deficiencies of the prior art.

SUMMARY OF THE INVENTION

According to one aspect of the invention, a method for adaptively optimizing a wireless receiver is disclosed. An algorithm calculates the expected impact of actual interferences and uses them to determine the optimal receiver parameters.

According to another aspect of the invention, an adaptive radio module of a wireless receiver is disclosed. The adaptive radio module comprises adjustable components to achieve optimal performance.

According to still another aspect of the invention, an adaptive radio system with adaptive radio modules and a separate scanner module is disclosed. The separate scanner module scans a predetermined RF spectrum around the desired signal band containing all relevant frequencies, measures present interferences, and according to the results, determines the optimal receiver parameters in the adaptive radio modules.

According to yet another aspect of the invention, an adaptive radio system with adaptive radio modules and a base station radio module without a scanner module is disclosed. The adaptive radio modules themselves scan the relevant spectrum and calculate the required parameters, or transmit them to the base station radio module where the interferences are measured and their effects are evaluated and the parameters are returned to the adaptive radio modules.

The actual "picture" of the RF environment in the spectrum around the received signal frequency band is measured to find out the intensity and frequency characteristics of all interference present at each given time that may affect the receiving quality. Adjustable filters and attenuators are used at appropriate places in the adaptive radio module in order to optimize the receiver parameters. This can significantly improve the receiver performance.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Figure 1:
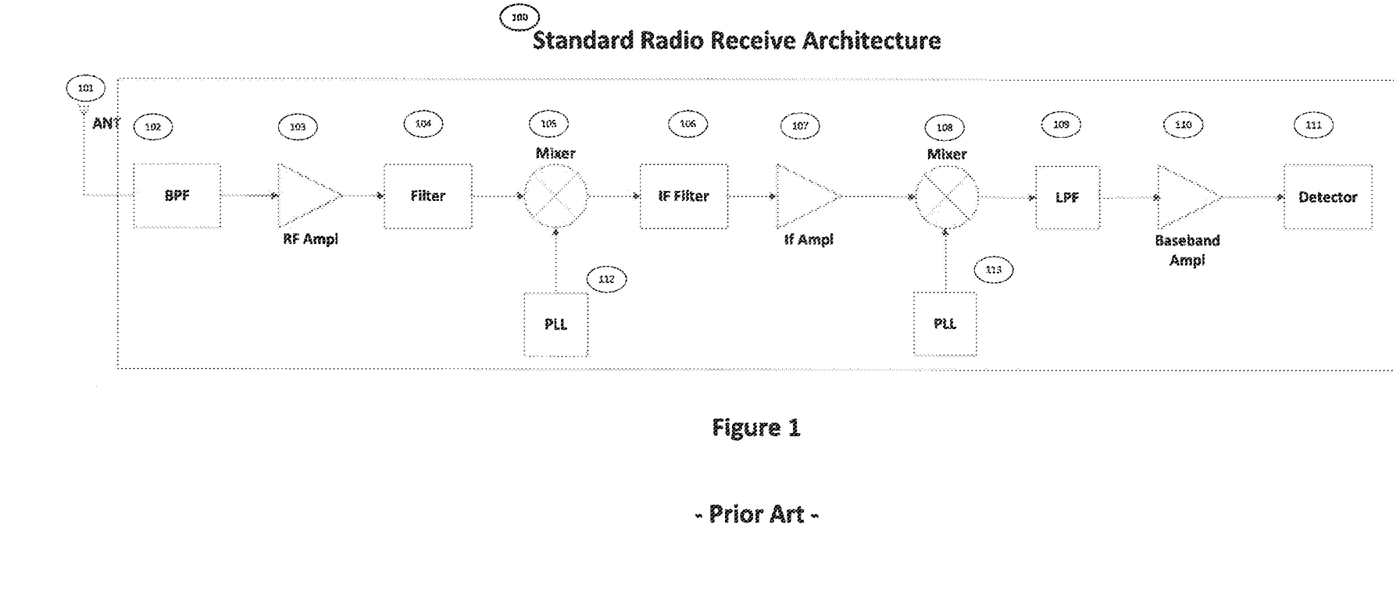
FIG. 1 shows the block diagram of a typical architecture of a conventional receiver.

Turning now to the drawings, and in particular to FIG. 1, there is shown a diagram of a standard architecture of a conventional wireless receiver. This wireless receiver has fixed predetermined levels of sensitivity and selectivity. These levels remain unchanged regardless of RF environmental changes, and the location in which the receiver is used. In the receiver 100, bandpass filter 102 receives the desired signal and the interference signals from the antenna 101. The output of the bandpass filter 102 includes all signals in the bandpass filter's predetermined pass band. Amplifier 103 provides a certain amount of amplification to the signals output from filter 102. Filter 104 removes out of band spurious signals produced by amplifier 103. The first mixer 105 is used to down-convert the signals to a lower IF band. The signals are filtered by a filter 106 and then amplified by an amplifier 107. Then, in the mixer 108, the signals are converted to the low frequency that is allocated by the filter 109 and amplified by an amplifier 110. The detector 111 demodulates the received signal. A typical approach to increase communication range would be to increase the sensitivity of the receiver. However, when trying this approach, the communication range was unexpectedly reduced. This was completely opposite of the desired and expected outcome.

The inventors have discovered that the unexpected decrease in distance was due to insufficient selectivity of the receiver. The inventors have created an algorithm, as will be explained in further detail below, that calculates a required selectivity as the difference between interference power and receiver sensitivity, and then optimizes the receiver parameters, solving the aforementioned problem.

Figure 2A:
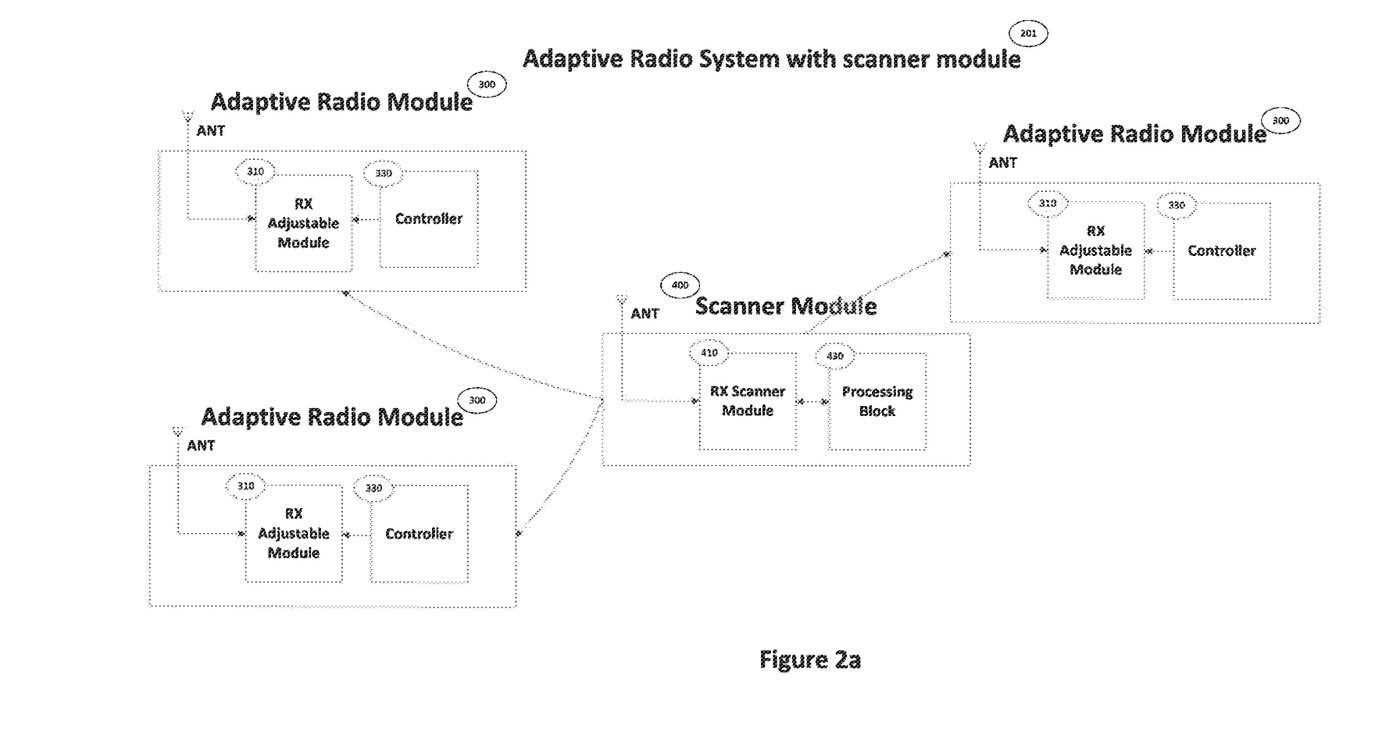
FIG. 2a shows an exemplary embodiment of an adaptive radio system according to the present invention with a separate scanner module.
Figure 3:
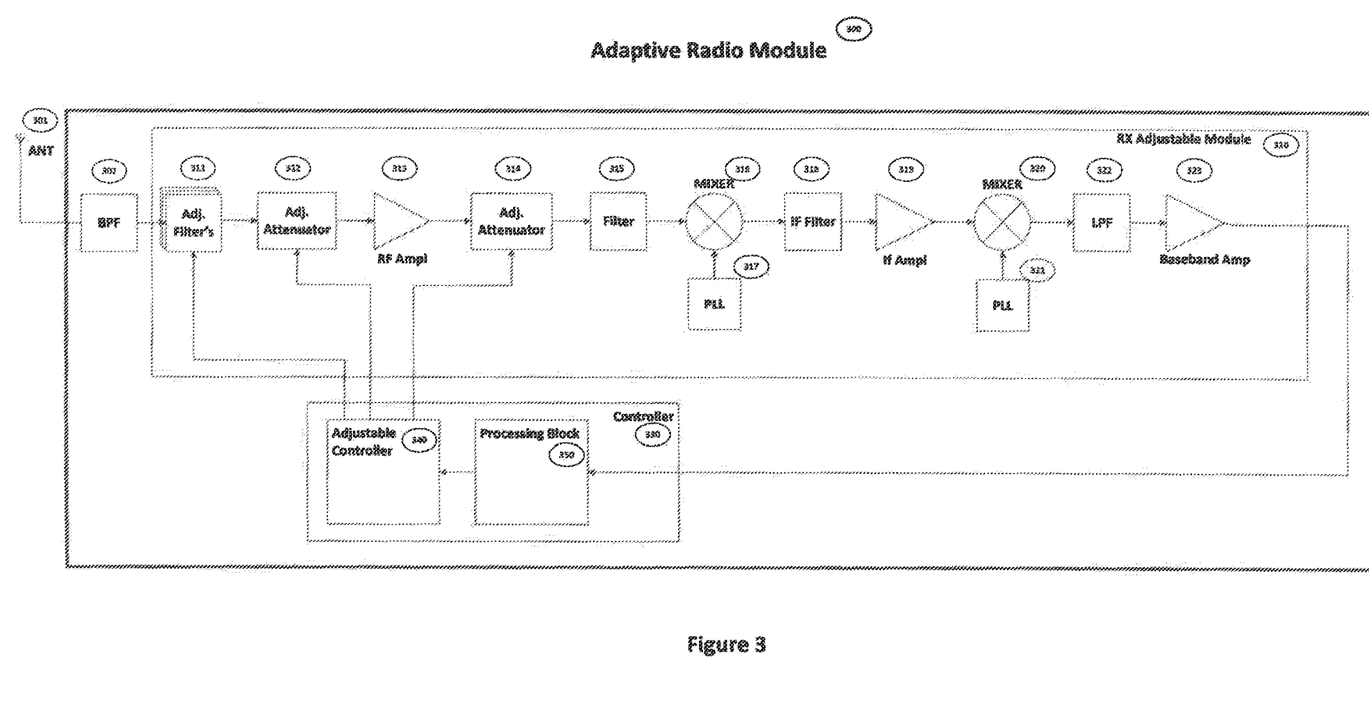
FIG. 3 shows an exemplary embodiment of an adaptive radio module according to the present invention.

FIG. 2a shows an exemplary embodiment of the invention, in which an adaptive radio system 201 with a scanner module 400 is used. In this system, a separate scanner module 400 scans a predetermined RF spectrum around a desired signal band containing all relevant frequencies, calculates possible interferences, and determines the optimal receiver parameters in the adaptive radio modules 300. The adaptive radio module 300 comprises an Rx adjustable module 310, which is the adaptive receiver and the controller 330, which implements the adaptation algorithm. More details of the adaptive radio module 300 are shown in FIG. 3. The scanner module 400 comprises an Rx scanner module 410, which measures the interference power and a processing block 430, which builds a mathematical model of the interference and calculates the necessary selectivity of the receiver. For more details, the scanner module 400 is shown in FIG. 4.

Figure 2B:
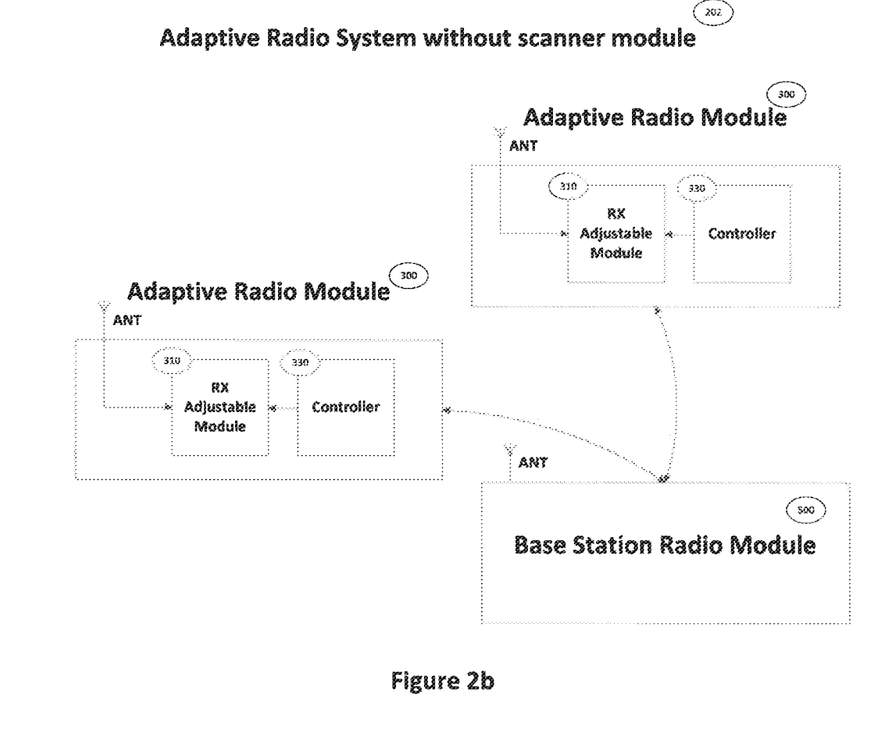
FIG. 2b shows an exemplary embodiment of an adaptive radio system according to the present invention without a separate scanner module.

FIG. 2b shows another exemplary embodiment of the invention of an adaptive radio system 202 without a separate scanner module. In this embodiment, the adaptive radio modules 300 themselves scan the relevant spectrum and calculate the required parameters, or transmit them to the base station 500 where the interference is calculated and the parameters are returned to the adaptive radio modules 300.

FIG. 3 illustrates the details of the adaptive radio module 300 with improved selectivity. The signals received by antenna 301 pass through a band pass filter 302, which is designed to suppress out-of-band interference, including image rejection, and are supplied to adjustable module 310. The adjustable module 310 includes adjustable filters 311, filter 315, adjustable attenuators 312 and 314, and an RF amplifier 313 which changes the receiver selectivity to its optimal values at each time. Filter 315 removes out of band spurious signals produced by amplifier 313. The first mixer 316 and PLL 317 are used to down-convert the signals to a lower IF band. The signals are filtered by a filter 318 and then amplified by an amplifier 319. Then, the mixer 320 and PLL 321 convert the signals to a low frequency that is allocated by the filter 322 and amplified by a baseband amplifier 323. Controller 330 includes a processing block 350, connected to the output baseband amplifier 323 and is used to calculate, according to the adaptation algorithm of FIG. 5, the most dangerous interferences, and the required attenuation at each frequency for mitigation of the interferences and controls the adjustable controller 340.

Figure 4:
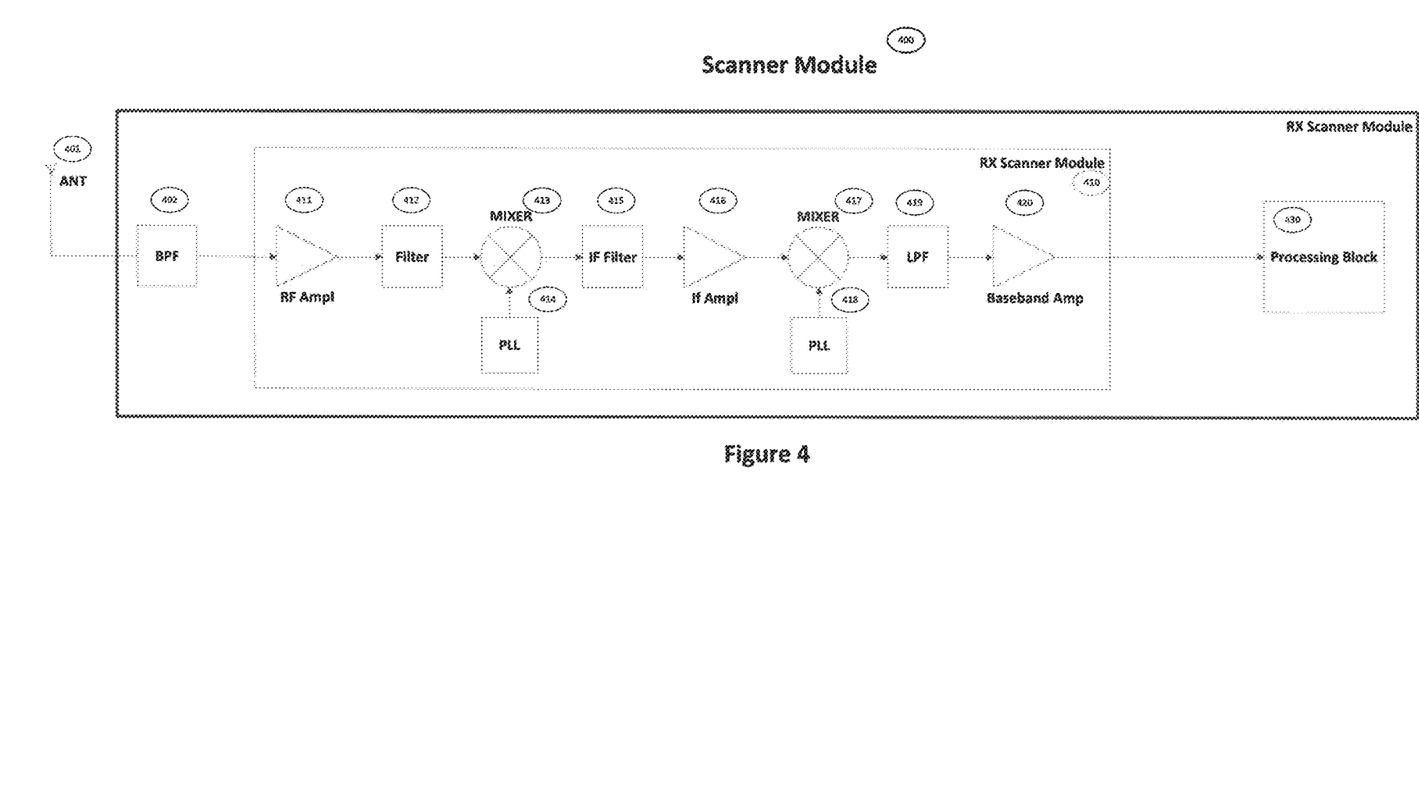
FIG. 4 shows an exemplary embodiment of a scanner module according to the present invention.

FIG. 4 describes scanner module 400. The signal received by antenna 401 is filtered by a bandpass filter 402 and is supplied to the Rx scanner module 410, which is connected to Processing block 430. In the Rx scanner module 410, the signal is amplified by amplifier 411, filtered by a filter 412 and converted using mixer 413 and PLL 414 to IF frequency. IF frequency is filtered by filter 415 and amplified by amplifier 416. Mixer 417, PLL 418 and filter 419 convert the signals to a low frequency, which is amplified by amplifier 420 and is supplied to processing block 430.

Figure 5:
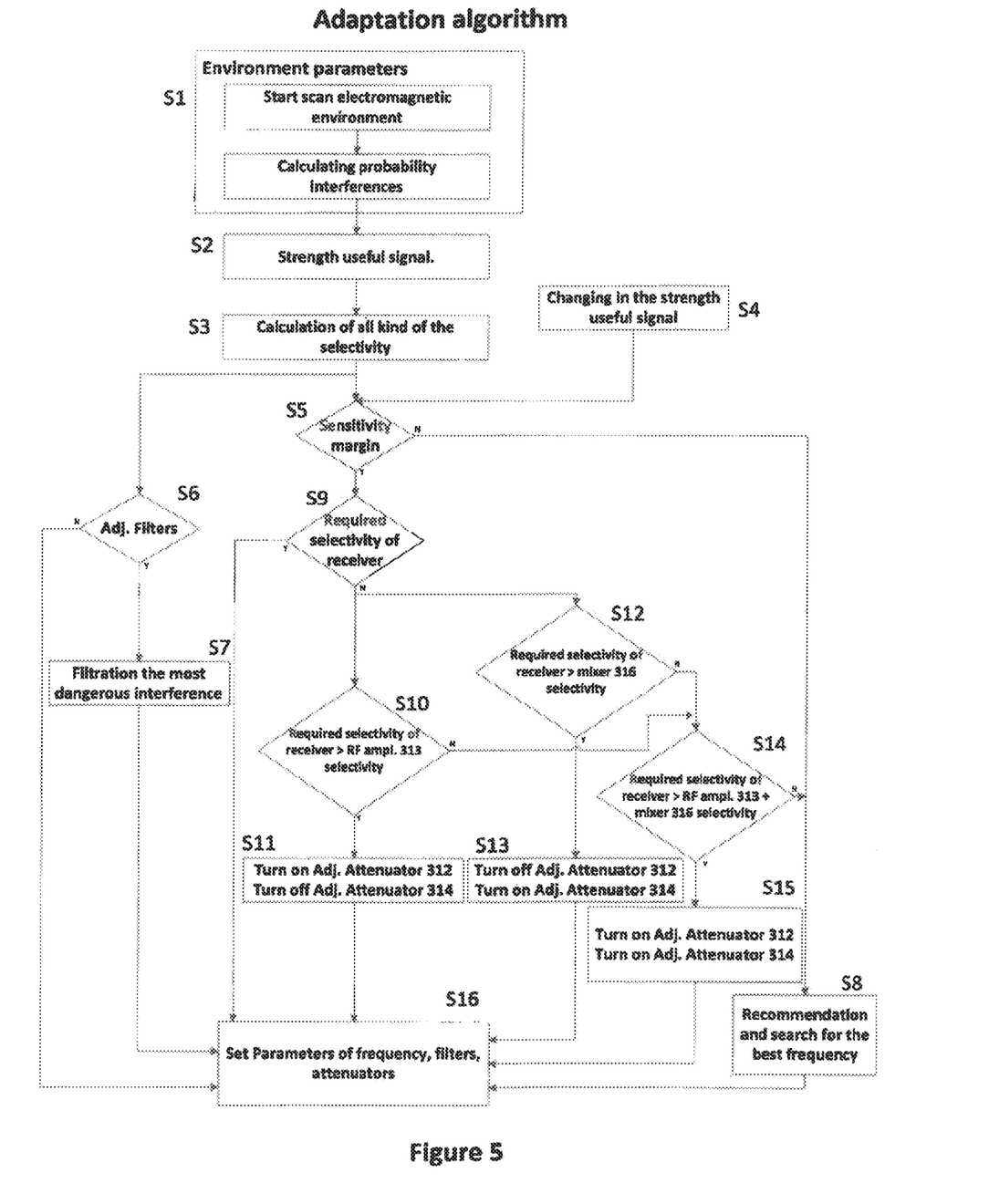
FIG. 5 shows an exemplary embodiment of an adaptation algorithm according to the present invention.

The adaptation algorithm is shown in FIG. 5 and carried out by the controller 330. The theoretical basis for this invention is the mathematical model of the RF environment and the calculation of the probability of receive described in the provisional patent International Application PCT/AU2019/050195, file reference MID6578. In this patent publication, the probability of receive for four models of the electromagnetic environments is calculated. It is proposed, on the basis of a mathematical model, to predict the quality of receive and calculate the necessary selectivity for a given quality of receive and thus prevent receive errors. It is proposed to apply two types of adaptation: frequency, additional filtering and changing the gain of the receiver.

In all these adaptations, the source data are the measured interference powers by the receiver in scan mode. The measured data is recorded in the table described in the International Application PCT/AU2019/050195 patent publication.

In the present algorithm, described in more detail in conjunction with FIG. 5, the required selectivity is calculated as the difference between the interference level and receiver sensitivity. The interference level for each type of interference (i.e. linear interference, non-linear additive interference, non-linear multiplicative interference, and a dangerous type of interference) Is calculated as $E_r = EcD/h$ where D is the dynamic range of each kind of interference, h is signal to noise ratio (i.e. Ec/Er), and Ec is a signal that is needed to be received. In this way, the interference power that most affects the reception quality and the required selectivity is calculated. This selectivity is compared with that of the receiver and the difference is a parameter K for adaptation. In other words, K is the value by which the interference must be attenuated in order to ensure the required reception quality. With this in mind, the obtained interference level is calculated as $E_r = EcDK/h$ and it should be equal to or less than the available selectivity of the receiver. If the interference is more than 10% from the edge of the receiver band, a filter can be adjusted that will attenuate the interference by K. In another case, attenuators are adjusted by K, operating according to the algorithm.

With frequency adaptation, the frequency range is determined, in which the interference situation is such, that the required receive probability is provided with the existing receiver selectivity. The wireless receiver scans the relevant frequency band and calculates the probability of reliable reception and interference in S1. The selectivity degradation is estimated according to all kind of interference signals such as adjacent channels, image signal, blockers, and intermodulation, etc. The allowable interference level is calculated, as the level at which the receiver provides the required probability of reception. The receiver switches to a frequency that meets these conditions.

The strength of the received signal is calculated in S2.

The required selectivity improvement is calculated as the difference between this interference level and the receiver sensitivity in S3. Interfering signals that can be removed by means of a proper filter will be excluded in the attenuation calculations.

Any changes in the strength of the received signal are calculated in S4.

Filtration determines the most dangerous interference, i.e. the interference that affects the receive probability most strongly. The interference is reduced by the adjustable filter 311 and provides the required receive quality, as shown in S6 and S.

In S5, the sensitivity margin is calculated. The amount of signal power above the receiver sensitivity determines how much the selectivity can be improved. Thus, knowing the sensitivity margin, the adjustable receiver will adjust attenuators 312 and 314 that will reduce the level of all signals, the desired received signal and interference signals alike, down to a level so that the desired signal level will be equal to the receiver sensitivity. Thus, maximum allowable selectivity improvement is equal to the difference between the sensitivity and the power of the desired received signal.

When the signal power has no margin, that is, the power is equal to the sensitivity, the only way to allow for reliable communication is changing the operation frequency to a "safe" spectrum. This is shown in S8.

The probability of receive is calculated and the interference power is determined at which the probability of receive is 1. Then, the required selectivity is calculated in S9 as the difference between this interference level and the sensitivity in the case, when the power of the received useful signal cannot be determined. In most cases, the power of the received useful signal is known and then the selectivity is calculated as the difference between the interference power and the power of the received signal. The selectivity for linear reception channels, intermodulation, blocking, amplitude to phase conversion is separately calculated. When the required selectivity is less than the available selectivity of the amplifier 313 and mixer 316, then adaptation is not performed.

The required selectivity is compared with the available selectivity of the amplifier 313 and the mixer 316 separately. The difference between the required and available selectivity is the attenuation of attenuators 312 and 314.

When the required selectivity is higher than the available selectivity of the RF amplifier 313, the attenuator 312 is turned on to the desired value, while attenuator 314 is short circuited and turned off. This is shown in S10 and S11.

In S12 and S13, the second attenuator is adjusted and the first attenuator is turned off when the calculated required selectivity is higher than the available selectivity of the mixer while controlling the power level of the received signal to not be less than a sensitivity of the wireless receiver and an accepted margin.

When the required selectivity is higher than the available selectivity of the amplifier 313, the attenuator 312 is turned on while controlling the power of the useful signal so that it is not less than the sensitivity and the accepted margin.

When the required selectivity is lower than the available selectivity of the amplifier 313 but higher than the available selectivity of the mixer 316 and the power of the useful signal far exceeds the sensitivity, then attenuator 312 is first turned on, then, if necessary, attenuator 314 is turned on. This is shown in S14 and S15.

When the power of the useful signal is close to sensitivity, then only the attenuator 314 is turned on.

In S16, the parameters related to frequency, filters, and attenuators are set in order to perform the desired adaptation.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method of adaptively optimizing a wireless receiver, said method comprising:
   scanning a predetermined RF spectrum around a desired signal band;
   measuring an intensity and frequency of an interfering signal in the desired signal band;
   calculating an amount of attenuation and/or filtering at the interfering signal frequency required for mitigation of the interfering signal based on the measured intensity and frequency;
   adjusting components in the wireless receiver based upon the calculated amount of attenuation and/or filtering to suppress the interfering signal;
   calculating an allowable interference level as a level at which the wireless receiver provides a required probability of reception;
   calculating a receive probability as a function of selectivity based on the measured intensity and frequency of the interfering signal;
   calculating a required selectivity as a difference between the allowable interference level and a sensitivity of the wireless receiver; and
   automatically adapting selectivity parameters of the wireless receiver to a required reception quality.

2. The method of claim 1, wherein only attenuator components in the wireless receiver are adjusted.

3. The method of claim 1, wherein only filter components in the wireless receiver are adjusted.

4. The method of claim 1, wherein filter and attenuator components in the wireless receiver are adjusted.

5. An adaptive wireless receiver, comprising:
   at least one antenna;
   an adjustable module having adjustable components operatively coupled to the at least one antenna;
   a controller operatively coupled to the adjustable module; said controller configured to scan a predetermined RF spectrum around a desired signal band, to measure an intensity and frequency of an interfering signal in the desired signal band, and to adjust the adjustable components of the adjustable module based upon the measured intensity and frequency of the interfering signal to suppress the interfering signal;
   wherein the adjustable module includes a band pass filter coupled to the at least one antenna, an adjustable filter component coupled to the band pass filter, a first adjustable attenuator component coupled to the adjustable filter component, a first amplifier with an input coupled to the first adjustable attenuator component, a second adjustable attenuator component coupled to an output of the first amplifier a mixer with an input coupled to the second adjustable attenuator component, a second amplifier with an input coupled to an output of the mixer, said controller being coupled to the adjustable filter component, the first and second adjustable attenuator components, and an output of the second amplifier said controller configured to calculate an amount of attenuation and/or filtering at the interfering signal frequency required for mitigation of the interfering signal based on the measured intensity and frequency, and to adjust at least one of the adjustable filter component the first adjustable attenuator component, and the second adjustable attenuator component based on the calculated amount of attenuation and/or filtering; and
   wherein the controller is configured to calculate a required selectivity separately for linear interference, non-linear additive interference, non-linear multiplicative interference, and to determine a frequency and power of a dangerous interference.

6. The adaptive wireless receiver of claim 5, wherein the controller is configured to automatically tune the adjustable filter component to the frequency of the dangerous interference in order to obtain the required selectivity.

7. The adaptive wireless receiver of claim 5, wherein the controller is configured to determine an operating frequency that allows for a required probability of receive and to automatically switch to this operating frequency.

8. An adaptive wireless receiver, comprising:
   at least one antenna;
   an adjustable module having adjustable components operatively coupled to the at least one antenna;
   a controller operatively coupled to the adjustable module; said controller configured to scan a predetermined RF spectrum around a desired signal band, to measure an intensity and frequency of an interfering signal in the desired signal band, and to adjust the adjustable components of the adjustable module based upon the measured intensity and frequency of the interfering signal to suppress the interfering signal;
   wherein the adjustable module includes a band pass filter coupled to the at least one antenna, an adjustable filter component coupled to the band pass filter, a first adjustable attenuator component coupled to the adjustable filter component, a first amplifier with an input coupled to the first adjustable attenuator component, a second adjustable attenuator component coupled to an output of the first amplifier a mixer with an input coupled to the second adjustable attenuator component a second amplifier with an input coupled to an output of the mixer said controller being coupled to the adjustable filter component, the first and second adjustable attenuator components, and an output of the second amplifier said controller configured to calculate an amount of attenuation and/or filtering at the interfering signal frequency required for mitigation of the interfering signal based on the measured intensity and frequency, and to adjust at least one of the adjustable filter component the first adjustable attenuator component, and the second adjustable attenuator component based on the calculated amount of attenuation and/or filtering; and
   wherein the controller is configured to calculate a probability of receive and the measured intensity of the interfering signal when the probability of receive is one.

9. The adaptive wireless receiver of claim 8, wherein the controller is configured to calculate a required selectivity as a difference between measured intensities of interfering signals when the probability of receive is one and a receiver sensitivity when a power level of a received signal cannot be determined.

10. The adaptive wireless receiver of claim 8, wherein the controller is configured to calculate a required selectivity as a difference between measured intensities of interfering signals when the probability of receive is one and a power level of a received signal.

11. The adaptive wireless receiver of claim 10, wherein the controller is configured to compare the calculated required selectivity with available selectivities of the first amplifier and the mixer separately and to calculate a difference between the required selectivity and the available selectivities.

12. The adaptive wireless receiver of claim 11, wherein the controller is configured to perform no adjusting of the adjustable components when the calculated required selectivity is less than the available selectivities of the first amplifier and the mixer.

13. The adaptive wireless receiver of claim 11, wherein the controller is configured to adjust the first attenuator component and to turn off the second attenuator component when the calculated required selectivity is higher than the available selectivity of the first amplifier while controlling the power level of the received signal to not be less than a sensitivity of the wireless receiver and an accepted margin.

14. The adaptive wireless receiver of claim 11, wherein the controller is configured to adjust the second attenuator component and to turn off the first attenuator component when the calculated required selectivity is higher than the available selectivity of the mixer while controlling the power level of the received signal to not be less than a sensitivity of the wireless receiver and an accepted margin.

15. The adaptive wireless receiver of claim 11, wherein the controller is configured to adjust the second attenuator component and to turn off the first attenuator component when the power level of the received signal is close to a sensitivity of the wireless receiver.

16. The adaptive wireless receiver of claim 11, wherein the controller is configured to adjust the first attenuator component when the calculated required selectivity is lower than the available selectivity of the first amplifier and higher than the available of selectivity of the mixer and to adjust the second attenuator component when the power level of the received signal far exceeds a sensitivity of the wireless receiver.

17. The adaptive wireless receiver of claim 8, wherein the controller is configured to determine an operating frequency that allows for a required probability of receive and to automatically switch to this operating frequency.

* * * * *